UNITED STATES PATENT OFFICE.

KARL ENZINGER, OF WORMS, GERMANY, ASSIGNOR TO THE FILTER UND BRAUTECHNISCHE MASCHINEN FABRIK ACTIEN-GESELLSCHAFT, VORMALS L. A. ENZINGER, OF SAME PLACE.

PROCESS OF PRODUCING FILTERING MATERIAL.

SPECIFICATION forming part of Letters Patent No. 665,652, dated January 8, 1901.

Application filed August 18, 1900. Serial No. 27,255. (No specimens.)

*To all whom it may concern:*

Be it known that I, KARL ENZINGER, of Worms, Germany, have invented a certain new and useful Process of Producing a Filtering Material, of which the following is a full, clear, and exact specification.

The subject of the present invention is a new process of manufacturing a filtering material by means of which beer and other liquids can be filtered and sterilized simultaneously.

For producing the filtering material I employ infusorial earth or kieselguhr, with which experiments in this regard have already been made. Formerly, however, the kieselguhr has simply been boiled with acid solutions and then dried, whereas according to the present process the kieselguhr is treated in an autoclave without being boiled and the moist character of the product is retained.

The process consists in heating the kieselguhr in an aqueous solution of twenty per cent. hydrochloric acid and one per cent. nitric acid for some hours in an autoclave at a temperature of about 120° centigrade. It is then freed from the liquid by filtering or by means of a centrifugal machine and afterward washed with water until the acid is removed. The mass is then pressed, and to prevent its drying up is wrapped in vegetable parchment. The product thus procured will filter nearly twice as rapidly as kieselguhr boiled with acid solutions and dried, this quality being due particularly to the favorable structure of the kieselguhr so obtained. The material produced will float much more easily in water and possesses the property of filtering in such a high degree that not only are liquids freed from all turbidity, but are sterilized through, the bacteria and other mortific agents being destroyed.

The moist material packed in vegetable parchment must be dissolved in water, a considerable quantity of the latter being employed, so that the mass is not converted into a paste or viscous liquid, but the water merely rendered turbid. This cloudy water is passed through a filter-press, the filtering medium of which consists of cloths, fabric, or porous sheets of any suitable kind. By this means the water, rendered turbid by the mass, as above described, is filtered and the filtering material is precipitated in a uniform layer on the filtering-cloths or the like of the filter-press. The latter is now ready for use for filtering and sterilizing beer, wine, brandy, or other liquids. These liquids pass through the filtering material, which has been deposited on the cloths or fabric or the like of the press (which merely serve as a base to receive the said material) and in their passage are thoroughly filtered and sterilized.

Having thus fully described my invention, what I claim as new, and desire to secure by Letters Patent, is—

1. The process of producing a filtering material, which consists in heating kieselguhr in an aqueous solution of hydrochloric and nitric acids in an autoclave for several hours substantially as described, freeing the product from the liquid, washing said product with water to remove the acid, pressing it to expel superfluous water, and wrapping it in suitable packing to retain its moisture, all substantially as herein set forth.

2. The process of producing a filtering material, which consists in heating kieselguhr in an aqueous solution of twenty per cent. hydrochloric acid and one per cent. nitric acid in an autoclave for several hours at a temperature of about 120° centigrade, freeing the product from liquid, washing said product with water to remove the acid, pressing it to expel superfluous water, and wrapping it in vegetable parchment to retain its moisture, all substantially as herein set forth.

In witness whereof I have hereunto set my hand in presence of two witnesses.

KARL ENZINGER.

Witnesses:
JEAN GRUND,
RICHARD GUENTHER.